(12) United States Patent
Chiu et al.

(10) Patent No.: US 7,033,534 B2
(45) Date of Patent: Apr. 25, 2006

(54) METHOD FOR FORMING MICROSTRUCTURES ON A SUBSTRATE USING A MOLD

(75) Inventors: Raymond Chi-Hing Chiu, Woodbury, MN (US); Kenneth Robert Dillon, White Bear Lake, MN (US)

(73) Assignee: 3M Innovative Properties Company, St. Paul, MN (US)

( * ) Notice: Subject to any disclaimer, the term of this patent is extended or adjusted under 35 U.S.C. 154(b) by 294 days.

(21) Appl. No.: 09/975,385

(22) Filed: Oct. 9, 2001

(65) Prior Publication Data

US 2003/0098528 A1    May 29, 2003

(51) Int. Cl.
*B05D 3/02* (2006.01)
(52) U.S. Cl. .................... 264/496; 264/259
(58) Field of Classification Search ............. 264/430, 264/434, 479, 494, 496, 614, 636, 259
See application file for complete search history.

(56) References Cited

U.S. PATENT DOCUMENTS

| | | | |
|---|---|---|---|
| 3,689,346 A | 9/1972 | Rowland | 156/245 |
| 3,811,814 A | 5/1974 | Earle et al. | 425/385 |
| 3,816,043 A | 6/1974 | Snelling et al. | 425/4 |
| 4,026,714 A | 5/1977 | Lewis | 106/47 |
| 4,340,276 A | 7/1982 | Maffitt et al. | 350/164 |
| 4,536,435 A | 8/1985 | Utsumi et al. | 428/209 |
| 4,554,259 A | 11/1985 | Franklin et al. | 501/67 |
| 4,617,279 A | 10/1986 | Manabe et al. | 501/10 |
| 4,640,900 A | 2/1987 | Kokubu et al. | 501/67 |
| 4,734,143 A | 3/1988 | Meoni | 156/102 |
| 4,756,856 A | 7/1988 | Choinski | 264/22 |
| 4,857,420 A | 8/1989 | Maricle et al. | 429/30 |
| 4,867,935 A | 9/1989 | Morrison, Jr. | 264/61 |
| 4,975,104 A | 12/1990 | Kim | 65/18.1 |
| 5,004,950 A | 4/1991 | Lee | 313/582 |
| 5,011,391 A | 4/1991 | Kawasaki et al. | 445/24 |
| 5,037,723 A | 8/1991 | Hwang | 430/320 |
| 5,096,401 A | 3/1992 | Tamura et al. | 425/115 |
| 5,116,704 A | 5/1992 | Kwon | 430/3 |
| 5,136,207 A | 8/1992 | Miyake et al. | 313/582 |
| 5,175,030 A | 12/1992 | Lu et al. | 428/30 |
| 5,183,597 A | 2/1993 | Lu | 264/1.4 |
| 5,205,770 A | 4/1993 | Lowrey et al. | 445/24 |
| 5,209,688 A | 5/1993 | Nishigaki et al. | 445/24 |
| 5,247,227 A | 9/1993 | Park | 313/584 |
| 5,268,233 A | 12/1993 | Heller et al. | 428/523 |
| 5,342,563 A | 8/1994 | Quinn et al. | 264/63 |
| 5,352,478 A | 10/1994 | Miyake et al. | 427/68 |
| 5,484,314 A | 1/1996 | Farnworth | 445/24 |
| 5,509,840 A | 4/1996 | Huang et al. | 445/24 |

(Continued)

FOREIGN PATENT DOCUMENTS

EP    0 802 170    10/1997

(Continued)

*Primary Examiner*—Steven P. Griffin
*Assistant Examiner*—Carlos Lopez
(74) *Attorney, Agent, or Firm*—Carolyn A. Fischer

(57) ABSTRACT

In a method of making a microstructured assembly, a substantially uniform coating of a curable material is formed on a substrate with the coating defining a leading edge. The coating is contacted with a mold starting at the leading edge to form in the curable material a plurality of barrier regions connected by intervening land regions. The curable material is cured and the mold is removed. Optionally, the coating includes a binder. Such a coating can optionally be debinded. In addition, the coating can be fired to form ceramic microstructures.

24 Claims, 5 Drawing Sheets

U.S. PATENT DOCUMENTS

| | | | |
|---|---|---|---|
| 5,527,624 A | 6/1996 | Higgins et al. | 428/523 |
| 5,545,670 A | 8/1996 | Bissbort et al. | 514/562 |
| 5,581,876 A | 12/1996 | Prabhu et al. | 29/851 |
| 5,585,428 A | 12/1996 | Quinn et al. | 524/400 |
| 5,601,468 A | 2/1997 | Fujii et al. | 445/24 |
| 5,629,583 A | 5/1997 | Jones et al. | 313/495 |
| 5,658,832 A | 8/1997 | Bernhardt et al. | 264/272.11 |
| 5,667,418 A | 9/1997 | Fahlen et al. | 445/25 |
| 5,672,460 A | 9/1997 | Katoh et al. | 430/198 |
| 5,703,433 A | 12/1997 | Fujii et al. | 313/484 |
| 5,707,267 A | 1/1998 | Hayashi | 445/24 |
| 5,714,840 A | 2/1998 | Tanabe et al. | 313/581 |
| 5,725,407 A | 3/1998 | Liu et al. | 445/52 |
| 5,747,931 A | 5/1998 | Riddle et al. | 313/581 |
| 5,776,545 A | 7/1998 | Yoshiba et al. | 427/356 |
| 5,840,465 A | 11/1998 | Kakinuma et al. | 430/270.1 |
| 5,853,446 A | 12/1998 | Carre et al. | 65/17.3 |
| 5,854,152 A | 12/1998 | Kohli et al. | 501/70 |
| 5,854,153 A | 12/1998 | Kohli | 501/70 |
| 5,909,083 A | 6/1999 | Asano et al. | |
| 6,008,582 A | 12/1999 | Asano et al. | 313/582 |
| 6,023,130 A | 2/2000 | Sakasegawa et al. | 313/582 |
| 6,043,604 A | 3/2000 | Horiuchi et al. | 313/582 |
| 6,149,482 A | 11/2000 | Sakasegawa et al. | |
| 6,184,621 B1 | 2/2001 | Horiuchi et al. | 313/586 |
| 6,220,915 B1 | 4/2001 | Radloff | 445/60 |
| 6,247,986 B1 | 6/2001 | Chiu et al. | 445/24 |
| 6,306,948 B1 | 10/2001 | Yokoyama et al. | 524/492 |
| 6,325,610 B1 | 12/2001 | Chiu et al. | 425/150 |
| 6,352,763 B1 | 3/2002 | Dillon et al. | |
| 2001/0007682 A1 | 7/2001 | Chiu et al. | |
| 2003/0100192 A1 | 5/2003 | Chiu | |

FOREIGN PATENT DOCUMENTS

| | | |
|---|---|---|
| EP | 0 836 892 | 4/1998 |
| EP | 0 855 731 | 7/1998 |
| EP | 0 866 487 | 9/1998 |
| EP | 0 893 813 A2 | 1/1999 |
| FR | 2 764 438 | 11/1998 |
| GB | 1257621 | 12/1971 |
| JP | 1-137534 | 5/1989 |
| JP | 11-339668 | 12/1989 |
| JP | 3-54569 | 3/1991 |
| JP | 8-273537 | 10/1996 |
| JP | 8-321258 | 12/1996 |
| JP | 9-12336 | 1/1997 |
| JP | 09012336 | 1/1997 |
| JP | 9-134676 | 5/1997 |
| JP | 10-134705 | 5/1997 |
| JP | 9-147754 | 6/1997 |
| JP | 9-283017 | 10/1997 |
| JP | 10-326571 | 12/1998 |
| JP | 11-135025 | 5/1999 |
| JP | 2000-21303 | 1/2000 |
| JP | 2000-340106 | 12/2000 |
| WO | 97/22961 | 6/1997 |
| WO | 99/60446 | 11/1999 |
| WO | 00/39829 | 7/2000 |
| WO | WO 00/39831 | 7/2000 |
| WO | 00/58990 | 10/2000 |
| WO | 01/20636 | 3/2001 |
| WO | WO 01/20636 | 3/2001 |
| WO | WO 01/30723 | 5/2001 |
| WO | 01/52299 | 7/2001 |
| WO | 01/95361 | 12/2001 |

METHOD FOR FORMING MICROSTRUCTURES ON A SUBSTRATE USING A MOLD

The present invention generally relates to methods of forming microstructures on a substrate using a mold, as well as the devices and articles formed using the methods. More specifically, the present invention relates to improved methods of molding ceramic microstructures that retain a desired shape after thermal processing. The present invention also relates to molding ceramic structures on patterned substrates for display applications, and to displays having molded barrier ribs

BACKGROUND

Advancements in display technology, including the development of plasma display panels (PDPs) and plasma addressed liquid crystal (PALC) displays, have led to an interest in forming electrically-insulating ceramic barrier ribs on glass substrates. The ceramic barrier ribs separate cells in which an inert gas can be excited by an electric field applied between opposing electrodes. The gas discharge emits ultraviolet (uv) radiation within the cell. In the case of PDPs, the interior of the cell is coated with a phosphor which gives off red, green, or blue visible light when excited by uv radiation. The size of the cells determines the size of the picture elements (pixels) in the display. PDPs and PALC displays can be used, for example, as the displays for high definition televisions (HDTV) or other digital electronic display devices.

One way in which ceramic barrier ribs can be formed on glass substrates is by direct molding. This has involved laminating a planar rigid mold onto a substrate with a glass- or ceramic-forming composition disposed therebetween. The glass- or ceramic-forming composition is then solidified and the mold is removed. Finally, the barrier ribs are fused or sintered by firing at a temperature of about 550° C. to about 1600° C. The glass- or ceramic-forming composition has micrometer-sized particles of glass frit dispersed in an organic binder. The use of an organic binder allows barrier ribs to be solidified in a green state so that firing fuses the glass particles in position on the substrate. However, in applications such as PDP substrates, highly precise and uniform barrier ribs are desirable.

SUMMARY OF THE INVENTION

In general, the invention is directed to methods of making articles and devices having microstructures disposed on a substrate, as well as the articles and devices formed thereby. PDP's and other display devices are examples of such articles and devices. One embodiment is a method of making a microstructured assembly. A substantially uniform coating of a curable material is formed on a substrate with the coating defining a leading edge. The coating is contacted with a mold starting at the leading edge to form in the curable material a plurality of barrier regions connected by intervening land regions. The curable material is cured and the mold is removed. Optionally, the coating includes a binder. Such a coating can optionally be debinded. In addition, the coating can be fired to form ceramic microstructures.

Another embodiment is also a method of making a microstructured assembly. A curable material is disposed on a substrate with the substrate having a first end. The curable material is contacted with a mold starting at the first end and proceeding at a substantially uniform contact speed and applying a substantially uniform contact pressure. The curable material is formed, using the mold, into a plurality of barrier regions connected by intervening land regions, wherein the land regions have a substantially uniform center thickness. Optionally, the coating includes a binder. Such a coating can optionally be debinded. In addition, the coating can be fired to form ceramic microstructures.

Yet another embodiment is another method of making a microstructured assembly. A substantially uniform coating of a curable material is formed on a substrate with the coating defining a leading edge and defining a coating area that is smaller than a surface area of the substrate. The coating is contacted with a mold starting at the leading edge. The mold forms the curable material into a plurality of barrier regions connected by intervening land regions without substantially enlarging the coating area. The curable material is cured and the mold is removed.

Another embodiment is a method of making a display. A substantially uniform coating of a curable material is formed on a display substrate with the coating defining a leading edge. The coating is contacted with a mold starting at the leading edge to form in the curable material a plurality of barrier ribs connected by intervening land regions. The curable material is cured and the mold is removed.

Yet other embodiments include devices and articles formed using any of the methods described above.

The above summary of the present invention is not intended to describe each disclosed embodiment or every implementation of the present invention. The Figures and the detailed description which follow more particularly exemplify these embodiments.

BRIEF DESCRIPTION OF THE DRAWINGS

The invention may be more completely understood in consideration of the following detailed description of various embodiments of the invention in connection with the accompanying drawings, in which.

Figure 1:
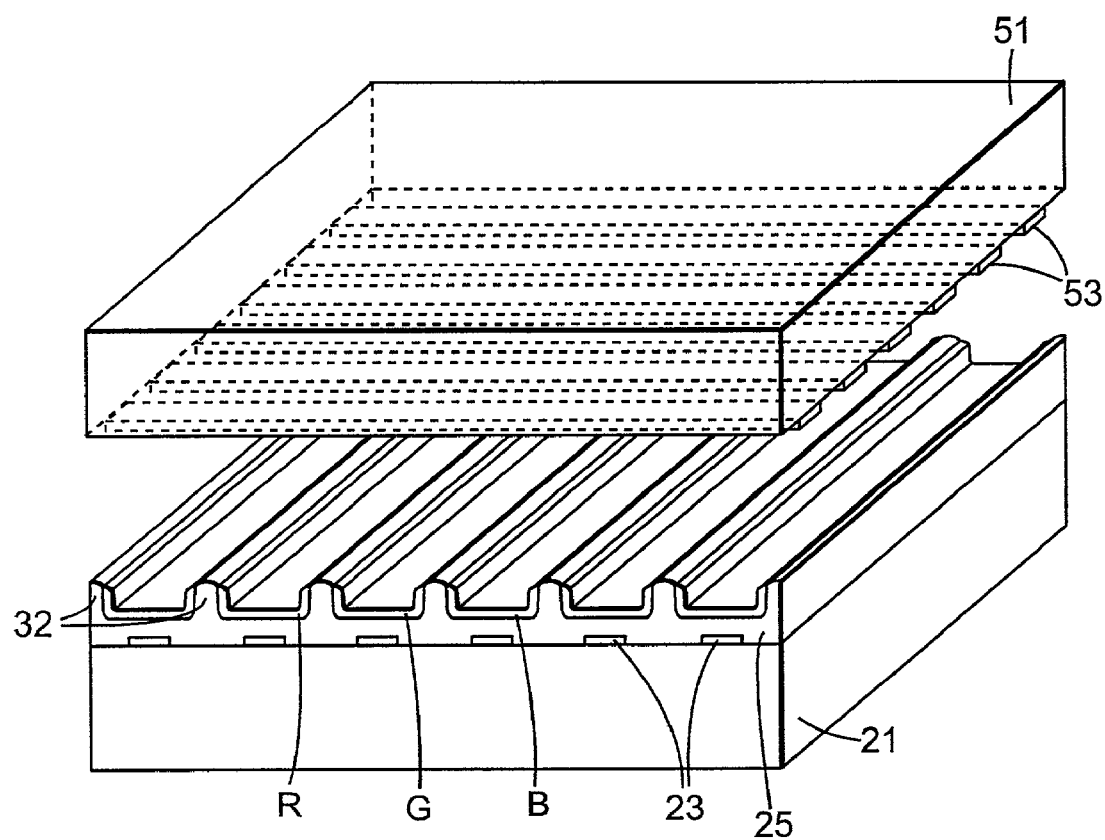
FIG. 1 is a three dimensional schematic representation of a plasma display panel assembly.

While the invention is amenable to various modifications and alternative forms, specifics thereof have been shown by way of example in the drawings and will be described in detail. It should be understood, however, that the intention is not to limit the invention to the particular embodiments described. On the contrary, the intention is to cover all modifications, equivalents, and alternatives falling within the spirit and scope of the invention.

DETAILED DESCRIPTION OF THE PREFERRED EMBODIMENT

The present invention is believed to be applicable to methods of making microstructures on a substrate using a mold, as well as the articles and devices made using the methods. In particular, the present invention is directed to making ceramic microstructures on a substrate using a mold. Plasma display panels (PDPs) can be formed using the methods and provide a useful illustration of the methods. It will be recognized that other devices and articles can be formed using these methods including, for example, electrophoresis plates with capillary channels and lighting applications. In particular, devices and articles that can utilize molded ceramic microstructures can be formed using the methods described herein. While the present invention is not so limited, an appreciation of various aspects of the invention will be gained through a discussion of the examples provided below.

Plasma Display Panels

Plasma display panels (PDPs) have various substrate elements, as illustrated in FIG. 1. The back substrate element, oriented away from the viewer, has a back substrate 21 with independently addressable parallel electrodes 23. The back substrate 21 can be formed from a variety of compositions, for example, glass. Ceramic microstructures 25 are formed on the back substrate 21 and include barrier rib portions 32 which are positioned between electrodes 23 and separate areas in which red (R), green (G), and blue (B) phosphors are deposited. The front substrate element includes a glass substrate 51 and a set of independently addressable parallel electrodes 53. These front electrodes 53, also called sustain electrodes, are oriented perpendicular to the back electrodes 23, also referred to as address electrodes. In a completed display, the area between the front and back substrate elements is filled with an inert gas. To light up a pixel, an electric field is applied between crossed sustain 53 and address electrodes 23 with enough strength to excite the inert gas atoms therebetween. The excited inert gas atoms emit uv (ultraviolet) radiation which causes the phosphor to emit red, green, or blue visible light.

Back substrate 21 is preferably a transparent glass substrate. Typically, for PDP applications back substrate 21 is made of soda lime glass which is optionally substantially free of alkali metals. The temperatures reached during processing can cause migration of the electrode material in the presence of alkali metal in the substrate. This migration can result in conductive pathways between electrodes, thereby shorting out adjacent electrodes or causing undesirable electrical interference between electrodes known as "crosstalk." Front substrate 51 is typically a transparent glass substrate which preferably has the same or about the same coefficient of thermal expansion as that of the back substrate 21.

Electrodes 23, 53 are strips of conductive material. The electrodes 23 are formed of a conductive material such as, for example, copper, aluminum, or a silver-containing conductive frit. The electrodes can also be a transparent conductive material, such as indium tin oxide, especially in cases where it is desirable to have a transparent display panel. The electrodes are patterned on back substrate 21 and front substrate 51. For example, the electrodes can be formed as parallel strips spaced about 120 μm to 360 μm apart, having widths of about 50 μm to 75 μm, thicknesses of about 2 μm to 15 μm, and lengths that span the entire active display area which can range from a few centimeters to several tens of centimeters. In some instances the widths of the electrodes 23, 53 can be narrower than 50 μm or wider than 75 μm, depending on the architecture of the microstructures 25.

The barrier ribs portions 32 in PDPs typically have heights of about 120 μm to 140 μm and widths of about 20 μm to 75 μm. The pitch (number per unit length) of the barrier ribs preferably matches the pitch of the electrodes. In other embodiments, the pitch of the barrier ribs in the mold can be larger or smaller than the pitch of the electrodes and the mold can be stretched, as described below, to match the pitch of the electrodes.

When using the methods of the present invention to make microstructures on a substrate (such as barrier ribs for a PDP), the coating material from which the microstructures are formed is preferably a slurry or paste containing a mixture of at least three components. The first component is a ceramic material (typically, a ceramic powder.) Generally, the ceramic material of the slurry or paste is ultimately fused or sintered by firing to form microstructures having desired physical properties adhered to the patterned substrate. The second component is a binder (e.g., a fugitive binder) which is capable of being shaped and subsequently hardened by curing or cooling. The binder allows the slurry or paste to be shaped into semi-rigid green state microstructures which are adhered to the substrate. The third component is a diluent which can promote release from the mold after alignment and hardening of the binder material, and can promote fast and complete burn out of the binder during debinding before firing the ceramic material of the microstructures. The diluent preferably remains a liquid after the binder is hardened so that the diluent phase-separates from the binder during binder hardening.

The ceramic material is chosen based on the end application of the microstructures and the properties of the substrate to which the microstructures will be adhered. One consideration is the coefficient of thermal expansion (CTE) of the substrate material. Preferably, the CTE of the ceramic material of the slurry, when fired, differs from the CTE of the substrate material by no more than about 10%. When the substrate material has a CTE which is much less than or much greater than the CTE of the ceramic material of the microstructures, the microstructures can warp, crack, fracture, shift position, or completely break off from the substrate during processing or use. Further, the substrate can warp due to a high difference in CTE between the substrate and the ceramic microstructures.

The substrate should be able to withstand the temperatures necessary to process the ceramic material of the slurry or paste. Glass or ceramic materials suitable for use in the slurry or paste preferably have softening temperatures of about 600° C. or less, and usually in the range of about 400° C. to 600° C. Thus, a preferred choice for the substrate is a glass, ceramic, metal, or other rigid material which has a softening temperature which is higher than that of the ceramic material of the slurry. Preferably, the substrate has a softening temperature which is higher than the temperature at which the microstructures are to be fired. If the material will not be fired, the substrate can also be made of materials, such as plastics. Ceramic materials suitable for use in the slurry or paste preferably have coefficients of thermal expansion of about $5 \times 10^{-6}/°C$. to $13 \times 10^{-6}/°C$. Thus, the substrate preferably has a CTE approximately in this range as well.

Choosing a ceramic material having a low softening temperature allows the use of a substrate also having a relatively low softening temperature. In the case of glass substrates, soda lime float glass having low softening temperatures is typically less expensive than glass having higher softening temperatures. Thus, the use of a low softening temperature ceramic material can allow the use of a less expensive glass substrate. In addition, low softening temperature ceramic materials in the slurry or paste can make high precision microstructures easier to obtain. For example, when fabricating barrier ribs on a glass substrate, the precision and accuracy in the alignment and placement of the barrier ribs with respect to the electrodes on the substrate should be maintained throughout processing. The ability to fire green state barrier ribs at lower temperatures can reduce the thermal expansion and the amount of stress relief required during heating, thus avoiding undue substrate distortion, barrier rib warping, and barrier rib delamination.

Lower softening temperature ceramic materials can be obtained by incorporating certain amounts of alkali metals, lead, or bismuth into the material. However, for PDP barrier ribs, the presence of alkali metals in the microstructured barriers can cause material from the electrodes to migrate across the substrate during elevated temperature processing. The diffusion of electrode material can cause interference, or "crosstalk", as well as shorts between adjacent electrodes, degrading device performance. Thus, for PDP applications, the ceramic powder of the slurry is preferably substantially free of alkali metal. In addition, the incorporation of lead or bismuth in the ceramic material of the slurry can make environmentally-friendly disposal of the material problematic. When the incorporation of lead or bismuth is not desirable, low softening temperature ceramic material can be obtained using phosphate or $B_2O_3$-containing compositions. One such composition includes ZnO and $B_2O_3$. Another such composition includes BaO and $B_2O_3$. Another such composition includes ZnO, BaO, and $B_2O_3$. Another such composition includes $La_2O_3$ and $B_2O_3$. Another such composition includes $Al_2O_3$, ZnO, and $P_2O_5$.

Other fully soluble, insoluble, or partially soluble components can be incorporated into the ceramic material of the slurry to attain or modify various properties. For example, $Al_2O_3$ or $La_2O_3$ can be added to increase chemical durability of the composition and decrease corrosion. MgO can be added to increase the glass transition temperature or to increase the CTE of the composition. $TiO_2$ can be added to give the ceramic material a higher degree of optical opacity, whiteness, and reflectivity. Other components or metal oxides can be added to modify and tailor other properties of the ceramic material such as the CTE, softening temperature, optical properties, physical properties such as brittleness, and so on.

Other means of preparing a composition which can be fired at relatively low temperatures include coating core particles in the composition with a layer of low temperature fusing material. Examples of suitable core particles include $ZrO_2$, $Al_2O_3$, $ZrO_2$—$SiO_2$, and $TiO_2$. Examples of suitable low fusing temperature coating materials include $B_2O_3$, $P_2O_5$, and glasses based on one or more of $B_2O_3$, $P_2O_5$, and $SiO_2$. These coatings can be applied by various methods. A preferred method is a sol-gel process in which the core particles are dispersed in a wet chemical precursor of the coating material. The mixture is then dried and comminuted (if necessary) to separate the coated particles. These particles can be dispersed in the glass or ceramic powder of the slurry or paste or can be used by themselves for the glass powder of the slurry or paste.

The ceramic material in the slurry or paste is preferably provided in the form of particles which are dispersed throughout the slurry or paste. The preferred size of the particles depends on the size of the microstructures to be formed and aligned on the patterned substrate. Preferably, the average size, or diameter, of the particles in the ceramic material of the slurry or paste is no larger than about 10% to 15% the size of the smallest characteristic dimension of interest of the microstructures to be formed and aligned. For example, PDP barrier ribs can have widths of about 20 μm, and their widths are the smallest feature dimension of interest. For PDP barrier ribs of this size, the average particle size in the ceramic material is preferably no larger than about 2 or 3 μm. By using particles of this size or smaller, it is more likely that the microstructures will be replicated with the desired fidelity and that the surfaces of the ceramic microstructures will be relatively smooth. As the average particle size approaches the size of the microstructures, the slurry or paste containing the particles may no longer conform to the microstructured profile. In addition, the maximum surface roughness can vary based in part on the ceramic particle size. Thus, it is easier to form smoother structures using smaller particles.

The binder of the slurry or paste is an organic binder chosen based on factors such as the ability to bind to the ceramic material of the slurry or paste, the ability to be cured or otherwise hardened to retain a molded microstructure, the ability to adhere to the patterned substrate, and the ability to volatilize (or burn out) at temperatures at least somewhat lower than those used for firing the green state microstructures. The binder helps bind together the particles of the ceramic material when the binder is cured or hardened so that the mold can be removed to leave rigid green state microstructures adhered to and aligned with the patterned substrate. The binder can be referred to as a "fugitive binder" because, if desired, the binder material can be burned out of the microstructures at elevated temperatures prior to fusing or sintering the ceramic material in the microstructures. Preferably, firing substantially completely burns out the fugitive binder so that the microstructures left on the patterned surface of the substrate are fused glass or ceramic microstructures which are substantially free of carbon residue. In applications where the microstructures used are dielectric barriers, such as in PDPs, the binder is preferably a material capable of debinding at a temperature at least somewhat below the temperature desired for firing without leaving behind a significant amount of carbon which can degrade the dielectric properties of the microstructured barriers. For example, binder materials containing a significant proportion of aromatic hydrocarbons, such as phenolic resin materials, can leave graphitic carbon particles during debinding which can require significantly higher temperatures to completely remove.

The binder is preferably an organic material which is radiation or heat curable. Preferred classes of materials include acrylates and epoxies. Alternatively, the binder can be a thermoplastic material which is heated to a liquid state to conform to the mold and then cooled to a hardened state to form microstructures adhered to the substrate. When precise placement and alignment of the microstructures on the substrate is desired, it is preferable that the binder is radiation curable so that the binder can be hardened under isothermal conditions. Under isothermal conditions (no change in temperature), the mold, and therefore the slurry or paste in the mold, can be held in a fixed position relative to the pattern of the substrate during hardening of the binder material. This reduces the risk of shifting or expansion of the mold or the substrate, especially due to differential thermal expansion characteristics of the mold and the substrate, so that precise placement and alignment of the mold can be maintained as the slurry or paste is hardened.

When using a binder that is radiation curable, it is preferable to use a cure initiator that is activated by radiation to which the substrate is substantially transparent so that the slurry or paste can be cured by exposure through the substrate. For example, when the substrate is glass, the binder is preferably visible light curable. By curing the binder through the substrate, the slurry or paste adheres to the substrate first, and any shrinkage of the binder material during curing will tend to occur away from the mold and toward the surface of the substrate. This helps the microstructures demold and helps maintain the location and accuracy of the microstructure placement on the pattern of the substrate.

In addition, the selection of a cure initiator can depend on what materials are used for the ceramic material of the slurry or paste. For example, in applications where it is desirable to form ceramic microstructures that are opaque and diffusely reflective, it can be advantageous to include a certain amount of titania ($TiO_2$) in the ceramic material of the slurry or paste. While titania can be useful for increasing the reflectivity of the microstructures, it can also make curing with visible light difficult because visible light reflection by the titania in the slurry or paste can prevent sufficient absorption of the light by the cure initiator to effectively cure the binder. However, by selecting a cure initiator which is activated by radiation that can simultaneously propagate through the substrate and the titania particles, effective curing of the binder can take place. One example of such a cure initiator is bis(2,4,6-trimethylbenzoyl)-phenylphosphineoxide, a photoinitiator commercially available from Ciba Specialty Chemicals, Hawthrone, N.Y., under the trade designation Irgacure™ 819. Another example is a ternary photoinitiator system, as described in U.S. Pat. No. 5,545,670, incorporated herein by reference, including, for example, a mixture of ethyl dimethylaminobenzoate, camphoroquinone, and diphenyl iodonium hexafluorophosphate. Both of these examples are active in the blue region of the visible spectrum near the edge of the ultraviolet in a relatively narrow region where the radiation can penetrate both a glass substrate and titania particles in the slurry or paste. Other cure systems can be selected for use in the process of the present invention based on, for example, the binder, the components of the ceramic material in the slurry or paste, and the material of the mold or the substrate through which curing is to take place.

The diluent of the slurry or paste is generally a material selected based on factors such as, for example, the ability to enhance mold release properties of the slurry subsequent to curing the fugitive binder and the ability to enhance debinding properties of green state structures made using the slurry or paste. The diluent is preferably a material that is soluble in the binder prior to curing and remains liquid after curing the binder. This provides two advantages. First, by remaining a liquid when the binder is hardened, the diluent reduces the risk of the cured binder material adhering to the mold. Second, by remaining a liquid when the binder is hardened, the diluent phase separates from the binder material, thereby forming an interpenetrating network of small pockets, or droplets, of diluent dispersed throughout the cured binder matrix. The advantages of phase separation of the diluent will become clear in the discussion that follows.

For many applications, such as PDP barrier ribs, it is desirable for debinding of the green state microstructures to be substantially complete before firing. Additionally, debinding is often the longest and highest temperature step in thermal processing. Thus, it is desirable for the slurry or paste to be capable of debinding relatively quickly and completely and at a relatively low temperature.

While not wishing to be bound by any theory, debinding can be thought of as being kinetically and thermodynamically limited by two temperature-dependent processes, namely diffusion and volatilization. Volatilization is the process by which decomposed binder molecules evaporate from a surface of the green state structures and thus leave a porous network for egress to proceed in a less obstructed manner. In a single phase resin binder, internally-trapped gaseous degradation products can blister and/or rupture the structure. This is more prevalent in binder systems that leave a high level of carbonaceous degradation products at the surface which can form an impervious skin layer to stop the egress of binder degradation gases. In some cases where single phase binders are successful, the cross sectional area is relatively small and the binder degradation heating rate is inherently long to prevent a skin layer from forming.

The rate at which volatilization occurs depends on temperature, an activation energy for volatilization, and a frequency or sampling rate. Because volatilization occurs primarily at or near surfaces, the sampling rate is typically proportional to the total surface area of the structures. Diffusion is the process by which binder molecules migrate to surfaces from the bulk of the structures. Due to volatilization of binder material from the surfaces, there is a concentration gradient which tends to drive binder material toward the surfaces where there is a lower concentration. The rate of diffusion depends on, for example, temperature, an activation energy for diffusion, and a concentration.

Because volatilization is limited by the surface area, if the surface area is small relative to the bulk of the microstructures, heating too quickly can cause volatile species to be trapped. When the internal pressure gets large enough, the structures can bloat, break or fracture. To curtail this effect, debinding can be accomplished by a relatively gradual increase in temperature until debinding is complete. A lack of open channels for debinding, or debinding too quickly, can also lead to a higher tendency for residual carbon formation. This in turn may necessitate higher debinding temperatures to ensure substantially complete debinding. When debinding is complete, the temperature can be ramped up more quickly to the firing temperature and held at that temperature until firing is complete. At this point, the articles can then be cooled.

The diluent enhances debinding by providing shorter pathways for diffusion and increased surface area. The diluent preferably remains a liquid and phase separates from the binder when the binder is cured or otherwise hardened. This creates an interpenetrating network of pockets of diluent dispersed in a matrix of hardened binder material. The faster that curing or hardening of the binder material occurs, the smaller the pockets of diluent will be. Preferably, after hardening the binder, a relatively large amount of relatively small pockets of diluent are dispersed in a network throughout the green state structures. During debinding, the low molecular weight diluent can evaporate quickly at relatively low temperatures prior to decomposition of the other high molecular weight organic components. Evaporation of the diluent leaves behind a somewhat porous structure, thereby increasing the surface area from which remaining binder material can volatilize and decreasing the mean path length over which binder material must diffuse to reach these surfaces. Therefore, by including the diluent, the rate of volatilization during binder decomposition is increased by increasing the available surface area, thereby increasing the rate of volatilization for the same temperatures. This makes pressure build up due to limited diffusion rates less likely to occur. Furthermore, the relatively porous structure allows pressures that are built up to be released easier and at lower thresholds. The result is that debinding can typically be performed at a faster rate of temperature increase while lessening the risk of microstructure breakage. In addition, because of the increased surface area and decreased diffusion length, debinding is complete at a lower temperature.

The diluent is not simply a solvent compound for the binder. The diluent is preferably soluble enough to be incorporated into the binder in the uncured state. Upon curing of the binder of the slurry or paste, the diluent should phase separate from the monomers and/or oligomers participating in the cross-linking process. Preferably, the diluent phase separates to form discrete pockets of liquid material in a continuous matrix of cured binder, with the cured binder binding the particles of the glass frit or ceramic material of the slurry or paste. In this way, the physical integrity of the cured green state microstructures is not greatly compromised even when appreciably high levels of diluent are used (i.e., greater than about a 1:3 diluent to resin ratio).

Preferably the diluent has a lower affinity for bonding with the ceramic material of the slurry or paste than the affinity for bonding of the binder with the ceramic material. When hardened, the binder should bond with the particles of the ceramic material. This increases the structural integrity of the green state structures, especially after evaporation of the diluent. Other desired properties for the diluent will depend on the choice of ceramic material, the choice of binder material, the choice of cure initiator (if any), the choice of the substrate, and other additives (if any). Preferred classes of diluents include glycols and polyhydroxyls, examples of which include butanediols, ethylene glycols, and other polyols.

In addition to ceramic powder, binder, and diluent, the slurry or paste can optionally include other materials. For example, the slurry or paste can include an adhesion promoter to promote adhesion to the substrate. For glass substrates, or other substrates having silicon oxide or metal oxide surfaces, a silane coupling agent is a preferred choice as an adhesion promoter. A preferred silane coupling agent is a silane coupling agent having three alkoxy groups. Such a silane can optionally be pre-hydrolyzed for promoting better adhesion to glass substrates. A particularly preferred silane coupling agent is a silano primer such as sold by Manufacturing Co. (3M), St. Paul, Minn. under the trade designation Scotchbond™ Ceramic Primer. Other optional additives can include materials such as dispersants which aid in mixing the ceramic material with the other components of the slurry or paste. Optional additives can also include surfactants, catalysts, anti-aging components, release enhancers, and so on.

Generally, the methods of the present invention typically use a mold to form the microstructures. The methods preferably use a mold capable of being stretched in at least one direction to align the pattern of the mold to a predetermined portion of the patterned substrate. The mold is preferably a flexible polymer sheet having a smooth surface and an opposing microstructured surface. The mold can be made by compression molding of a thermoplastic material using a master tool which has a microstructured pattern. The mold can also be made of a curable material which is cast and cured onto a thin, flexible polymer film. A discussion regarding the use of curved surfaces connecting the barrier regions and land regions and other mold/microstructure configurations is provided in U.S. patent application Ser. No. 09/974,223, entitled "Method for Forming Ceramic Microstructures on a Substrate Using a Mold and Articled Formed by the Method", filed on even date herewith, incorporated herein by reference.

The microstructured mold can be formed, for example, according to a process like the processes disclosed in U.S. Pat. No. 5,175,030 (Lu et al.) and U.S. Pat. No. 5,183,597 (Lu), incorporated herein by reference. The formation process includes the following steps: (a) preparing an oligomeric resin composition; (b) depositing the oligomeric resin composition onto a master negative microstructured tooling surface in an amount barely sufficient to fill the cavities of the master; (c) filling the cavities by moving a bead of the composition between a preformed substrate and the master, at least one of which is flexible; and (d) curing the oligomeric composition.

The oligomeric resin composition of step (a) is preferably a one-part, solvent-free, radiation-polymerizable, crosslinkable, organic oligomeric composition, although other suitable materials can be used. The oligomeric composition is preferably one which is curable to form a flexible and dimensionally-stable cured polymer. The curing of the oligomeric resin preferably occurs with low shrinkage. One example of a suitable oligomeric composition is an aliphatic urethane acrylate such as one sold by the Henkel Corporation, Ambler, Pa., under the trade designation Photomer™ 6010. Similar compounds are available from other suppliers.

Acrylate and methacrylate functional monomers and oligomers are preferred because they polymerize more quickly under normal curing conditions. Further, a large variety of acrylate esters are commercially available. However, methacrylate, acrylamide and methacrylamide functional ingredients can also be used without restriction. Herein, where acrylate is used, methacrylate is understood as being acceptable.

Polymerization can be accomplished by usual means, such as heating in the presence of free radical initiators, irradiation with ultraviolet or visible light in the presence of suitable photoinitiators, and irradiation with electron beam. One method of polymerization is by irradiation with ultraviolet or visible light in the presence of photoinitiator at a concentration of about 0.1 percent to about 1 percent by weight of the oligomeric composition. Higher concentrations can be used but are not normally needed to obtain the desired cured resin properties.

The viscosity of the oligomeric composition deposited in step (b) can be, for example, between 500 and 5000 centipoise (500 and $5000 \times 10^{-3}$ Pascal-seconds). If the oligomeric composition has a viscosity above this range, air bubbles might become entrapped in the composition. Additionally, the composition might not completely fill the cavities in the master tooling. For this reason, the resin can be heated to lower the viscosity into the desired range. When an oligomeric composition with a viscosity below that range is used, the oligomeric composition can experience shrinkage upon curing that prevents the oligomeric composition from accurately replicating the master.

Almost any material can be used for the base (substrate) of the patterned mold, as long as that material is substantially optically clear to the curing radiation and has enough strength to allow handling during casting of the microstructure. In addition, the material used for the base can be chosen so that it has sufficient thermal stability during processing and use of the mold. Polyethylene terephthalate or polycarbonate films are preferable for use as a substrate in step (c) because the materials are economical, optically transparent to curing radiation, and have good tensile strength. Substrate thicknesses of 0.025 millimeters to 0.5 millimeters are preferred and thicknesses of 0.075 millimeters to 0.175 millimeters are especially preferred. Other useful substrates for the microstructured mold include cellulose acetate butyrate, cellulose acetate propionate, polyether sulfone, polymethyl methacrylate, polyurethane, polyester, and polyvinyl chloride. The surface of the substrate may also be treated to promote adhesion to the oligomeric composition.

Examples of suitable polyethylene terephthalate based materials include: photograde polyethylene terephthalate; and polyethylene terephthalate (PET) having a surface that is formed according to the method described in U.S. Pat. No. 4,340,276, incorporated herein by reference.

A preferred master for use with the above-described method is a metallic tool. If the temperature of the curing and optional simultaneous heat treating step is not too great, the master can also be constructed from a thermoplastic material, such as a laminate of polyethylene and polypropylene.

After the oligomeric resin fills the cavities between the substrate and the master, the oligomeric resin is cured, removed from the master, and may or may not be heat treated to relieve any residual stresses. When curing of the mold resin material results in shrinkage of greater than about 5% (e.g., when a resin having a substantial portion of monomer or low molecular weight oligomers is used), it has been observed that the resulting microstructures may be distorted. The distortion that occurs is typically evidenced by concave microstructure sidewalls or slanted tops on features of the microstructures. Although these low viscosity resins perform well for replication of small, low aspect ratio microstructures, they are not preferred for relatively high aspect ratio microstructures for which the sidewall angles and the top flatness should be maintained. In forming ceramic barrier ribs for PDP applications, relatively high aspect ratio ribs are desired, and the maintenance of relatively straight sidewalls and tops on the barrier ribs can be important.

As indicated above, the mold can alternatively be replicated by compression molding a suitable thermoplastic against the master metal tool.

Method for Preparing Ceramic Microstructures

Methods have previously been described that enable molding and formation of ceramic microstructures on a patterned substrate. For example, PCT Patent Publication No. WO/0038829 and U.S. patent application Ser. No. 09/219,803, incorporated herein by reference, describe the molding and aligning of ceramic barrier rib microstructures on an electrode-patterned substrate. PCT Patent Publication No. WO/0038829 and U.S. patent application Ser. No. 09/219,803, describe methods to form ceramic barrier rib microstructures that are particularly useful in electronic displays, such as PDPs and PALC displays, in which pixels are addressed or illuminated via plasma generation between opposing substrates.

Figure 2:
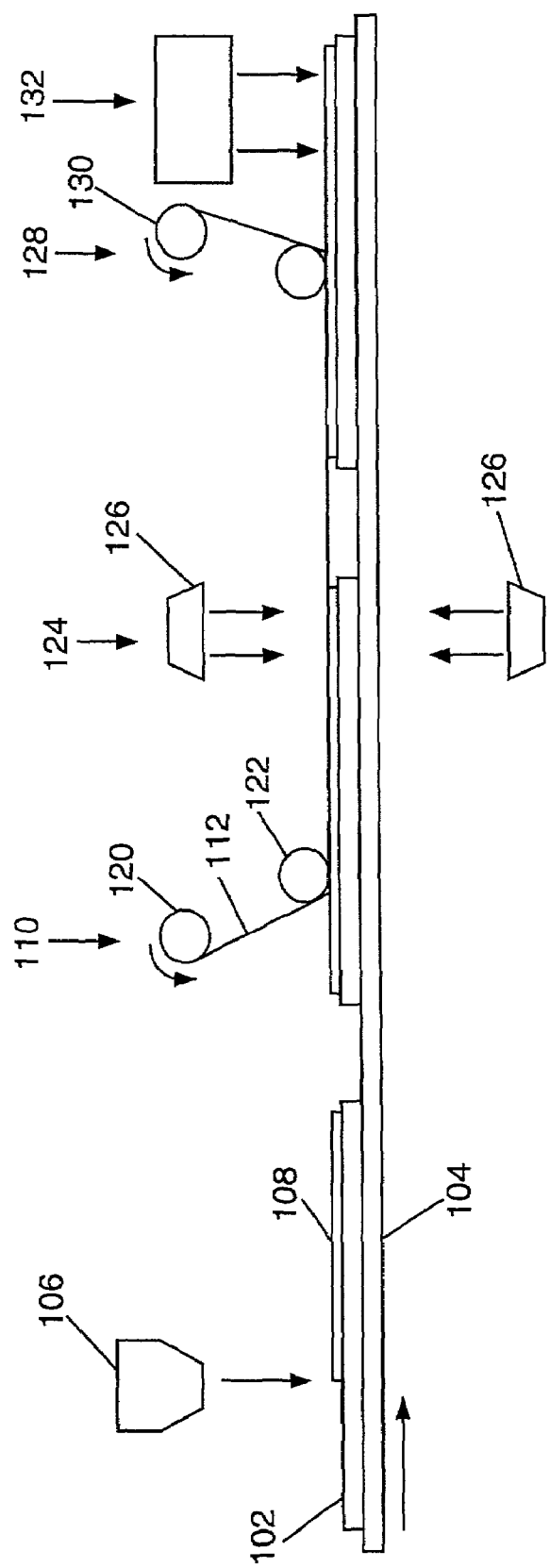
FIG. 2 is a schematic representation of processing stations in one embodiment of a method of making microstructures on a substrate.

New methods have been developed that use some of the features described in these references and can provide accurate and uniform microstructure parameters. FIG. 2 illustrates one embodiment of a method of forming microstructures on a substrate. One or more substrates 102 are conveyed by an apparatus 104 through a number of processing stations. These processing stations can be formed as a single apparatus or as multiple apparatuses.

At a coating station 106, a coating of curable slurry or paste containing ceramic material is disposed on the substrate 102. Typically, the coating 108 is coated on the substrate using a coating method that can produce substantially uniform coatings. Examples of such methods include knife coating, screen printing, extrusion coating, and reverse gravure coating.

Figure 5:
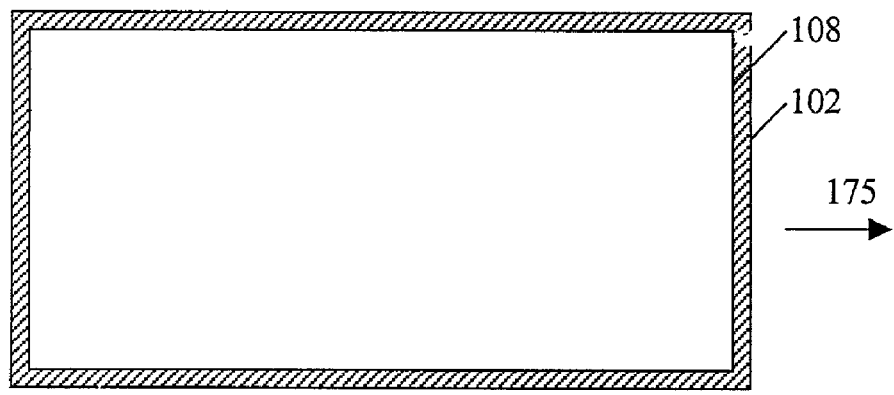
FIG. 5 is a schematic top view of one embodiment of a coating on a substrate, according to the invention.
Figure 6:
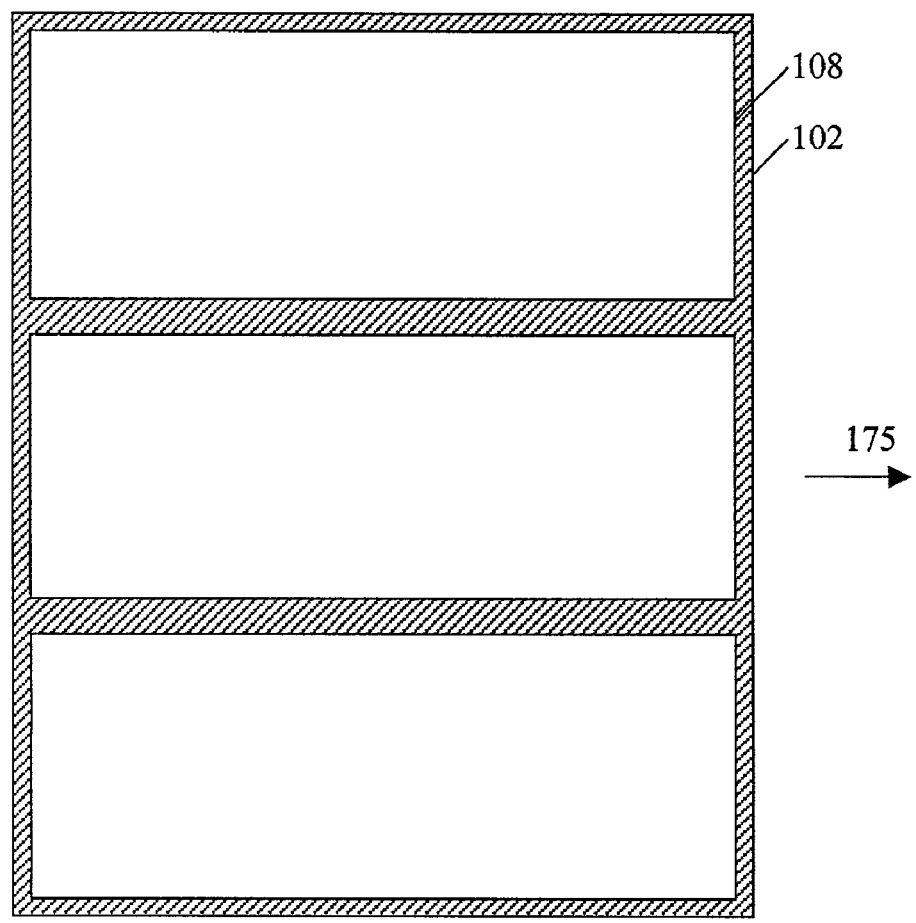
FIG. 6 is a schematic top view of another embodiment of a coating on a substrate according to the invention.
Figure 7:
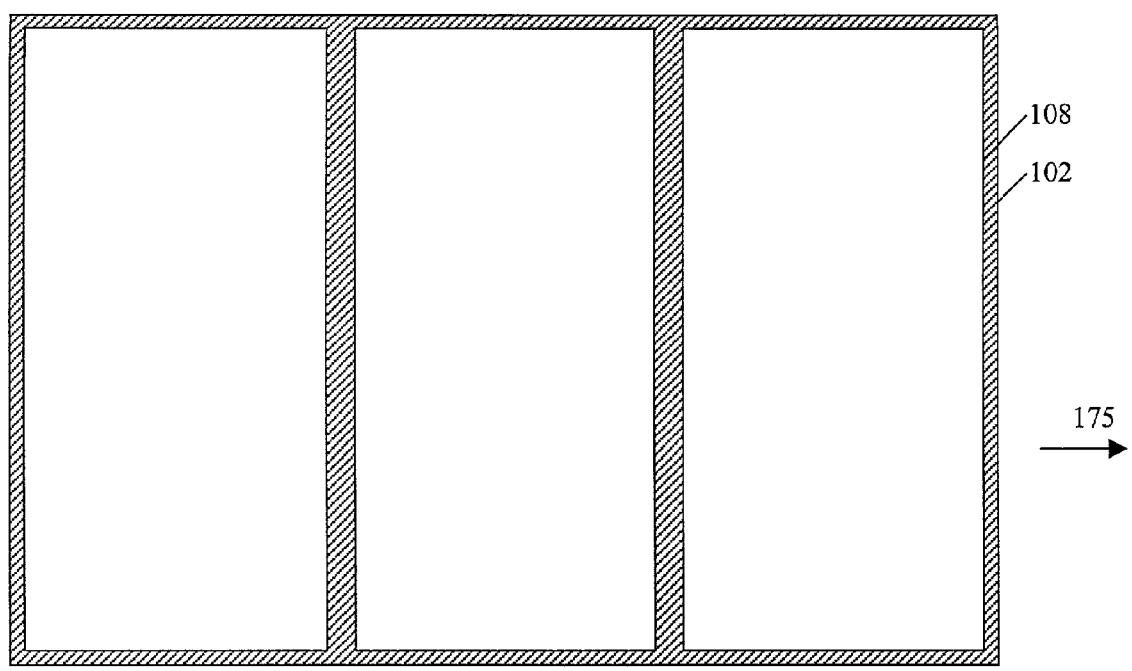
FIG. 7 is a schematic top view of yet another embodiment of a coating on a substrate according to the invention.

The coating 108 can be coated in one or more regions of the substrate 102. FIG. 5 illustrates one example in which the coating 108 is coated over substantially the entire substrate 102 where the arrow 175 illustrates the direction of transport in the process illustrated in FIG. 2. The edges are left free from ceramic material in this example to provide areas for handling the substrate or, particularly in the case of PDP and other display technologies, regions free of ceramic material where sealing to the front panel is performed and electrical connections can be made with electrodes patterned on the substrate. FIGS. 6 and 7 illustrate examples of a substrate 102 in which coating 108 is coated over different regions of the substrate 102. This can be useful when microstructures are only needed over a portion of the substrate or when multiple devices can be formed from a single substrate. For example, the substrates illustrated in FIGS. 6 and 7 might be separated into three display panels after formation of the microstructures.

Generally, the thickness of the coating varies by no more than 10%, 5%, 2% or less. In one embodiment, the coating has a thickness of about 50 to 75 µm. Other embodiments can use thicker or thinner coatings. The uniformity of the coating facilitates formation of uniform microstructures and reduces the precision needed for other process steps. In particular, without uniformity of the coating the subsequent molding process steps, described below, may need to be performed using much more precise contact pressure and contact speed control. Such precision can be substantially more difficult to maintain for these parameters than precision in the coating thickness.

In one embodiment, the coating area corresponds substantially to the area that will be covered by the microstructures (e.g., barrier ribs). In other words, during the processing illustrated in FIG. 2, the coating (as modified during the process) does not substantially spread beyond the area of the initial coating. In this embodiment, there is no need to remove excess coating pushed out of the initial coating area. The coating from the land regions is pushed into the barrier regions. The coating station defines the frame for the microstructures of the final article or device.

Figure 3:
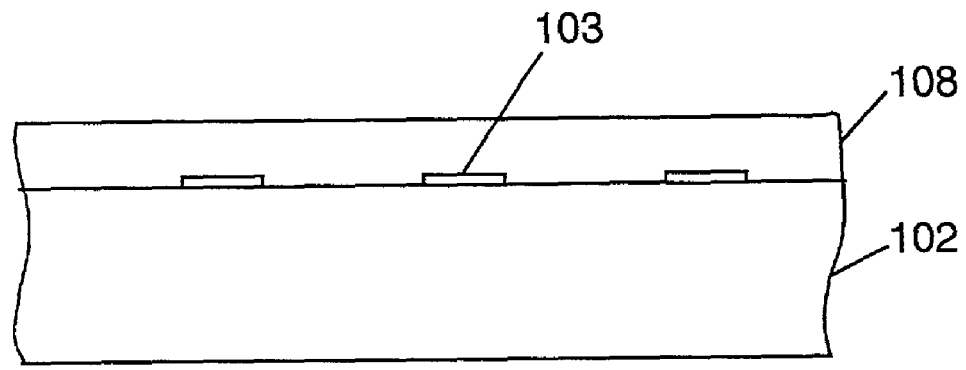
FIG. 3 is a schematic transverse cross-section of one embodiment of a coating on a substrate at one of the processing stations of FIG. 2.

FIG. 3 illustrates a transverse cross-section of a substrate 102 with the coating 108 of a slurry or paste containing a ceramic material after the substrate has passed the coating station. In this embodiment, the substrate 102 is illustrated as patterned with electrode structures 103 to form a plasma display panel. Structures other than electrodes can be used to form other products.

Figure 4:
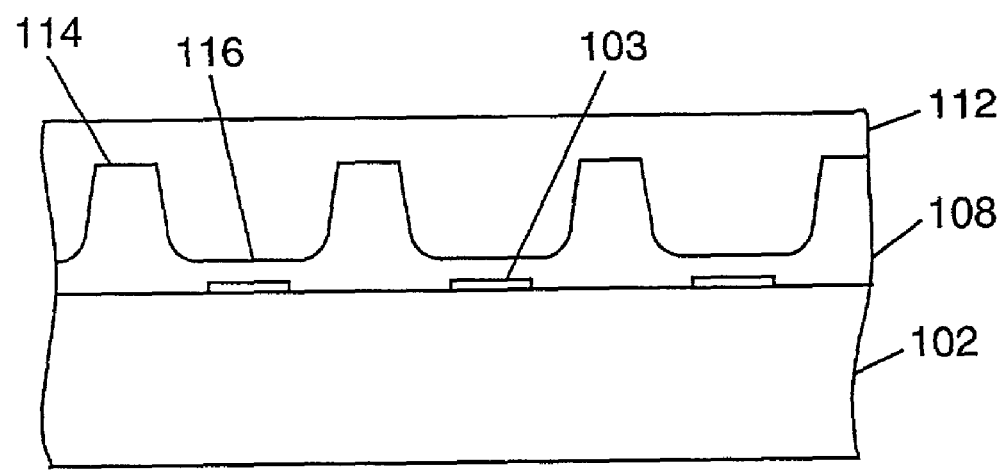
FIG. 4 is a schematic transverse cross-section of one embodiment of a mold and coating on a substrate at one of the processing stations of FIG. 2.

Returning to FIG. 2, the coated substrates are conveyed to a mold application station 110 in which a mold 112 is applied to the coating 108 generally starting at a leading edge of the coating. The mold 112 typically has a form that produces the desired microstructures. FIG. 4 illustrates a cross-section of the substrate 102 after application of the mold 112. The mold 112 in this embodiment is configured and arranged to form barrier regions 114 (e.g., barrier ribs) between the electrode structures 103. Intervening land regions 116 are provided between the barrier regions 114. The land regions 116 are typically substantially thinner than the barrier regions 114 and preferably have a) uniform thickness over the electrode structures 103 or b) any variation in the thickness over the electrode structures substantially replicated over each of the electrode structures. This can provide a replicable dielectric layer over each of the electrodes which can be desirable to provide for uniform pixel operation in a display. When the dielectric layer is non-uniform, pixels may not operate properly or may require use of an overcurrent (e.g., a current larger than needed to operate the average pixel) to ensure that all pixels will light up.

In one embodiment, the mold 112 is made of a material, such as a polymeric material, that can be formed into a roll 120. The mold 112 can be unrolled and applied to the coating 108 as the substrate 102 progress past the mold application station 110. Generally, a roller 122 or other pressure application device is provided to provide pressure to the mold 112 and the coating 108 to drive a portion of the coating into the barrier regions within the mold. Examples of pressure suitable for one embodiment range from 1 to 5 lb/in (about 0.2 to 1 kg/cm). If the pressure is sufficient for the coating material to fill the barrier regions in the mold and the coating is substantially uniform, then the speed at which the substrate 102 travels and the pressure applied by the roller 122 need not be precisely controlled to ensure that the land regions the desired replicable thickness. On the other hand, if the coating is not substantially uniform, then the pressure and speed will typically be more precisely controlled to obtain the desired replicable land region thickness.

The mold 112 can optionally be stretched to align at least a portion of the patterned surface of the mold 112 with a corresponding portion of the patterned substrate 102, as defined by the spacing of the electrodes 103. Under ideal conditions, the pattern of the mold as fabricated and the pattern of the substrate as fabricated would perfectly match. However, in practice this is often not the case. Processing steps can cause the dimensions of the substrate and the mold to change. While these dimensional changes might be slight, they can adversely affect the precise placement of microstructures aligned with the substrate pattern using a mold. For example, a PDP substrate having a width of 100 cm and an electrode pitch of 200 μm has each of 5000 barrier ribs placed precisely between adjacent electrodes. A difference between the pitch of the electrodes and the pitch of the mold of only 0.1 μm (or 0.05%) means that the pattern of the barrier ribs and the electrode pattern on the substrate will be misaligned, and be 180° out of phase in at least two regions across the substrate. This can be very detrimental for display device functionality. For such a PDP substrate, the pitch of the mold and the pitch of the electrodes preferably has a mismatch of 0.01% or less.

The process of the present invention can employ a mold capable of being stretched to facilitate precise alignment of the pattern of the mold with the pattern of the substrate. First, the mold is rough aligned by placing the pattern of the mold in the same orientation as the pattern of the substrate. The mold and substrate are checked for registry of their respective patterns. The mold is stretched in one or more directions parallel to the plane of the substrate until the desired registry is achieved. In the case of substrates having a pattern of parallel lines, such as electrodes on a PDP substrate, the mold is preferably stretched in one direction, either parallel to the substrate pattern or perpendicular to the substrate pattern, depending on whether the pitch of the mold is greater than or less than the pitch of the substrate pattern. When the mold 112 is stretched in a direction parallel to the parallel line pattern of the substrate 102, the pitch of the pattern of the mold is reduced during stretching to conform it to the pitch of the pattern of the substrate. To expand the pitch of the mold, the mold is stretched in the perpendicular direction.

Stretching can take place using a variety of known techniques. For example, the edges of the mold can be attached to adjustable rollers which can increase or decrease the tension on the mold until alignment is achieved. In cases where it is desirable to stretch the mold in more than one direction simultaneously, the mold can be heated to thermally expand the mold until alignment is achieved. In some instances, cameras, microscopes, or other visualization devices can be used to monitor the alignment visually. In other embodiments, the visualization can be performed by a computer using, for example, a CCD array. Typically, more than one visualization device is used to monitor the alignment at different points.

After alignment of the pattern of the mold with the pattern of the substrate, the material between the mold 112 and the substrate 102 is cured at a curing station 124 to form microstructures adhered to the surface of the substrate 102. Curing of the material can take place in a variety of ways depending on the binder used. For example, the material can be cured using one or more curing devices 126 providing visible light, ultraviolet light, e-beam radiation, or other forms of radiation, or by heat curing or by cooling to solidification from a melted state. When radiation curing, radiation can be propagated through the substrate 102, through the mold 112, or through the substrate 102 and the mold 112. Preferably, the cure system chosen facilitates adhesion of the cured material to the substrate 102. As such, in cases where material is used which tends to shrink during hardening and radiation curing, the material is preferably cured by irradiating through the substrate 102. If the material is cured only through the mold 112, the material might pull away from the substrate 102 via shrinkage during curing, thereby adversely affecting adhesion to the substrate 102. In the present application, curable refers to a material that may be cured as described above.

After curing the material to form microstructures 25 adhered to the substrate 102 surface and aligned to the pattern of the substrate 102, the mold 112 can be removed at a mold removal station 128 (e.g., by winding the mold onto a roller 130). Providing a stretchable and flexible mold 112 can aid in mold 112 removal because the mold 112 can be peeled back so that the demolding force can be focused on a smaller surface area. When microstructures having barrier regions 114 are molded, the mold 112 is preferably removed by peeling back along a direction parallel with barrier regions 114 and the pattern of the mold 112. This minimizes the pressure applied perpendicular to the barrier regions 114 during mold removal, thereby reducing the possibility of damaging the barrier regions. Preferably, a mold release is included either as a coating on the patterned surface 102 of the mold 112 or in the material that is hardened to form the microstructure itself. A mold release material becomes more important as higher aspect ratio structures are formed. Higher aspect ratio structures make demolding more difficult, and can lead to damage to the microstructures. As discussed above, curing the material from the substrate 102 side not only helps improve adhesion of the hardened microstructures to the substrate 102, but can allow the microstructures to shrink toward the substrate 102 during curing, thereby pulling away from the mold 112 to permit easier demolding.

After the mold 112 is removed, what remains is the patterned substrate 102 having a plurality of hardened microstructures adhered thereon and aligned with the pattern of the substrate 102. Depending on the application, this can be the finished product. In other applications, such as substrates 102 that will have a plurality of ceramic microstructures, the hardened material contains a binder that is preferably removed by debinding at elevated temperatures at a debinding/firing station 132. After debinding, or burning out of the binder, firing of the green state ceramic microstructures is performed to fuse the glass particles or sinter the ceramic particles in the material of the microstructures. This increases the strength and rigidity of the microstructures. Shrinkage can also occur during firing as the microstructure densifies. Fired microstructures maintain their positions and their pitch according to the substrate 102 pattern.

For PDP display applications, phosphor material is applied between the barrier regions of the microstructures. The substrate 102 then can be installed into a display assembly. This involves aligning a front substrate 51 having sustain electrodes 53 with the back substrate 21 having address electrodes 23, microstructures, and phosphor such that the sustain electrodes 53 are perpendicular with the address electrodes 23, as shown in FIG. 1. The areas through which the opposing electrodes cross define the pixels of the display. The space between the substrates is then evacuated and filled with an inert gas as the substrates are bonded together and sealed at their edges.

The integrity of the land regions 116 of the microstructures and a consistent dielectric thickness are important aspects of a plasma display panel. The thickness of the land regions 116 is important for the electrical performance of the plasma display panel. Substantial changes in the dielectric as a result of unequal thickness of the land regions 116 may result in undesirable light emission patterns (e.g., unequal emissions of the phosphors), caused by, for example, substantial differences in the switching voltage during operation of the plasma display panel. The methods of the present invention facilitate the formation of substantially uniform land regions.

It will be recognized that other articles can also be formed using a substrate with the molded microstructures. For example, the molded microstructures can be used to form capillary channels for applications such as electrophoresis plates. In addition, the molded microstructures could be used for plasma or other applications that produce light.

EXAMPLES

Examples 1–10

Barrier ribs were formed on a substrate using a mold and a photocurable glass frit slurry. A glass frit slurry was prepared. The glass frit slurry formulation used in these examples included 80 parts by weight RFW030 glass powder (Asahi Glass Co., Tokyo, Japan) which contains lead borosilicate glass frit with refractory fillers such as $TiO_2$ and $Al_2O_3$. To the glass powder was added 8.034 parts by weight BisGMA (bisphenol-a diglycidyl ether dimethacrylate), available form Sartomer Company, Inc., Exton, Pa., and 4.326 parts by weight TEGDMA (triethylene glycol dimethacrylate), available from Kyoeisha Chemical Co., Ltd., Japan, to form the curable fugitive binder. As a diluent, 7 parts by weight of 1,3 butanediol (Aldrich Chemical Co., Milwaukee, Wis.) was used. In addition, 0.12 parts by weight POCAII (phosphate polyoxyalkyl polyol), available from 3M Company, St. Paul, Minn. (other phosphate polyoxyalkyl polyols can be used and are available from other manufacturers) was added as a dispersant, 0.16 parts by weight A174 Silane (Aldrich Chemical Co., Milwaukee, Wis.) was added as a silane coupling agent, and 0.16 parts by weight Irgacur™ 819 (Ciba Specialty Chemicals, Basel, Switzerland) was added as the cure initiator. In additional, 0.20 parts BYK A555 from BYK Chemie USA, Wallingford, Conn. was added as a de-airing agent.

All liquid ingredients and the photo-initiator were combined in a stainless steel mixing container. The ingredients were blended using a cowles blade (VWR Scientific Products, West Chester, Pa.) driven by a pneumatic motor. With the mixing blade running, the solid ingredients were slowly added. After all the ingredients were incorporated, the mixture was blended for an additional 5 minutes. The slurry was transferred to a high-density polyethylene container charged with ½ inch cylindrical high density aluminum oxide milling media. Milling was performed using a paint conditioner (Red Devil Model 5100, Union, N.J.) for 30 minutes. The slurry was then drained from the ball mill. Finally, the slurry was milled using a 3-roll mill (Model 2.5×5 TRM, Charles Ross & Son Company, Haupauge, N.Y.) at 60° C.

A knife coater was used to coat the slurry on 2.3 mm thick soda-lime glass substrates (Libbey Owen Ford Glass Co., Charleston, W.Va.). The knife gap was set at 75 micrometers for all of the samples.

After coating, a mold having barrier rib features was laminated onto the coated substrate. Lamination pressure was nominally 0.68 kg/cm and lamination speed was nominally 3 cm/sec. The molds used were polycarbonate or photo-curable acrylate material which was cast and cured onto a high stiffness backing material such as 125 μm thick PET (E. I. Du Pont De Nemours and Company, Wilmington, Del.). The mold was produced by casting and curing of an acrylate resin against a metal tool. Molds having different types of barrier rib microstructures were evaluated.

After molding, the coated substrate was exposed to a blue light source to harden the glass frit slurry. Curing was performed using a blue light source at 1.5 inch (about 3.8 cm) sample surface. The light source is constructed from 10 super-actinic fluorescent lamps Model TLDK 30W/03, Philips Electronics N.V., Einhoven, Netherlands) spaced at 2 inches (about 5.1 cm) apart. These superactinic lamps provide light in a wavelength range of about 400 to 500 nm. Curing time was typically 30 seconds.

The mold was removed and the samples were sintered in air according to the following thermal cycle: 3° C./min to 300° C., 5° C./min to 560° C., soak for 20 minutes, and cooled at 2–3° C./min to ambient.

The following Table provides information on the products produced in each Example. All dimensions are for the green state prior to sintering. Draft angle is the angle of the sides of the barrier ribs relative to vertical. The radius of curvature of the rib base refers to the radius of curvature at which the barrier rib meets the land.

| Example | Rib Pitch (μm) | Rib Height (μm) | Top width (μm) | Draft angle | Rib base radius of curvature | Quality of blend |
| --- | --- | --- | --- | --- | --- | --- |
| 1 | 360 | 202 | 68 | 8° | <0.1 μm | N/a |
| 2 | 220 | 185 | 75 | 8° | chamfer | N/a |
| 3 | 360 | 213 | 37 | 8° | 50 | Poor |
| 4 | 360 | 213 | 37 | 8° | 50 | Good |
| 5 | 286 | 202 | 37 | 8° | 25 | Good |
| 6 | 286 | 202 | 37 | 8° | 50 | Good |
| 7 | 360 | 202 | 37 | 8° | 63 | Good |
| 8 | 360 | 202 | 37 | 8° | 75 | Good |
| 9 | 277 | 177 | 42 | 8° | 50 | Poor |
| 10 | 277 | 177 | 37 | 8° | 25 | Good |

Examples 11–14

Examples 11–14 were made in the same manner as Examples 1–10 except the coating gap was adjusted using metal feeler gauges. Barrier rib dimensions for these molds were 360 μm pitch, 213 μm high, 37 μm rib top width, 8° draft angle, and 50 μm smooth radius blend.

| Example | Coating thickness (μm) | Lamination speed (cm/sec) | Lamination pressure (kg/cm) | Fired land thickness (μm) |
|---|---|---|---|---|
| 11 | 64 | 2 | 0.68 | 8 |
| 12 | 76 | 2 | 0.68 | 16 |
| 13 | 89 | 2 | 0.68 | 19 |
| 14 | 102 | 2 | 0.68 | 28 |

This indicates that the land thickness can be controlled by choice of the coating thickness.

The present invention should not be considered limited to the particular examples described above, but rather should be understood to cover all aspects of the invention as fairly set out in the attached claims. Various modifications, equivalent processes, as well as numerous structures to which the present invention may be applicable will be readily apparent to those of skill in the art to which the present invention is directed upon review of the instant specification.

We claim:

1. A method of making a microstructured assembly, the method comprising:
    forming a substantially uniform coating of a curable material comprising a ceramic material on a substrate, the coating defining a leading edge;
    contacting the coating with a substantially optically clear mold, wherein the mold comprises a polymeric film, starting at the leading edge, the mold forming in the curable material a plurality of barrier regions connected by intervening land regions such that curable material is between the mold and the substrate;
    curing the curable material at least through the mold; and removing the mold.

2. The method of claim 1, wherein forming a substantially uniform coating comprises forming the coating of the curable material on the substrate with a thickness that varies by no more than 5%.

3. The method of claim 1, wherein the curable material further comprises a binder.

4. The method of claim 3, further comprising debinding the curable material after curing the curable material.

5. The method of claim 1, further comprising firing the curable material after removing the mold.

6. The method of claim 1, wherein contacting the coating comprises unrolling the mold while contacting the coating starting at the leading edge of the coating.

7. The method of claim 6, wherein removing the mold comprises rolling the mold onto a receiving element.

8. The method of claim 1, wherein the intervening land regions have a substantially uniform center thickness.

9. The method of claim 1, further comprising a plurality of electrodes disposed on the substrate.

10. The method of claim 9, further comprising aligning the land regions with the plurality of electrodes disposed on the substrate.

11. The method of claim 10, wherein aligning the land regions comprises stretching the mold to align the land regions with the plurality of electrodes.

12. The method of claim 1, wherein the coating defines a coating area that is smaller than a surface area of the substrate.

13. The method of claim 1, wherein the coating defines at least two individual coating areas.

14. A method of making a microstructured assembly, the method comprising:
    disposing a curable material comprising a ceramic material on a substrate, the substrate having a first end;
    contacting the curable material with a substantially optically clear mold, wherein the mold comprises a polymeric film, starting at the first end and proceeding at a substantially uniform contact speed and applying a substantially uniform contact pressure such that curable material is between the mold and the substrate;
    forming the curable material, using the mold, into a plurality of barrier regions connected by intervening land regions, wherein the land regions have a substantially uniform center thickness;
    and curing the curable material at least through the mold.

15. The method of claim 14, wherein disposing a curable material on a substrate comprises disposing the curable material on the substrate as a substantially uniform coating.

16. The method of claim 14, further comprising curing the curable material.

17. The method of claim 14, further comprising removing the mold.

18. The method of claim 14, wherein the curable material further comprises a binder.

19. The method of claim 18, further comprising debinding the curable material.

20. The method of claim 14, further comprising firing the ceramic material.

21. A method of making a microstructured assembly, the method comprising:
    forming a substantially uniform coating of a curable material comprising a ceramic material on a substrate, the coating defining a leading edge and defining a coating area that is smaller than a surface area of the substrate;
    contacting the coating with a substantially optically clear mold, wherein the mold comprises a polymeric film, starting at the leading edge, the mold forming the curable material into a plurality of barrier regions connected by intervening land regions without substantially enlarging the coating area such that curable material is between the mold and the substrate;
    curing the curable material at least through the mold; and
    removing the mold.

22. A method of making a display, the method comprising:
    forming a substantially uniform coating of a curable material comprising a ceramic material on a display substrate, the coating defining a leading edge;
    contacting the coating with a substantially optically clear mold, wherein the mold comprises a polymeric film, starting at the leading edge, the mold forming in the curable material a plurality of barrier ribs connected by intervening land regions such that curable material is between the mold and the substrate;
    curing the curable material at least through the mold; and
    removing the mold.

23. The method of claim 1 wherein the curable material is cured under isothermal conditions.

24. The method of claim 1 wherein the curable material is cured with radiation.

* * * * *

UNITED STATES PATENT AND TRADEMARK OFFICE
CERTIFICATE OF CORRECTION

PATENT NO. : 7,033,534 B2
DATED : April 25, 2006
INVENTOR(S) : Chiu, Raymond C.

It is certified that error appears in the above-identified patent and that said Letters Patent is hereby corrected as shown below:

Column 15,
Line 47, delete "dirnethacrylate" and insert -- dimethacrylate --.

Signed and Sealed this

Thirteenth Day of June, 2006

JON W. DUDAS
*Director of the United States Patent and Trademark Office*